United States Patent
Handke

(10) Patent No.: US 6,827,519 B2
(45) Date of Patent: Dec. 7, 2004

(54) TUBULAR BODY, ESPECIALLY A JOINT EYE FOR PISTON-CYLINDER UNIT

(75) Inventor: Günther Handke, Euerbach (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/067,480

(22) Filed: Feb. 5, 2002

(65) Prior Publication Data

US 2002/0118997 A1 Aug. 29, 2002

(30) Foreign Application Priority Data

Feb. 28, 2001 (DE) .......................... 101 09 627

(51) Int. Cl.⁷ ................................................. F16F 9/54
(52) U.S. Cl. ...................................... 403/119; 403/234
(58) Field of Search ...................... 29/525; 123/191.3, 123/194.4; 138/107, 108, 171; 248/53, 58, 78.1; 403/39, 230, 233, 234, 237, 291, 299, 346; 469/89; 285/236

(56) References Cited

U.S. PATENT DOCUMENTS

| | | | | |
|---|---|---|---|---|
| 368,459 A | * | 8/1887 | Clow | 256/45 |
| 480,513 A | * | 8/1892 | Redfield | 24/286 |
| 1,350,177 A | * | 8/1920 | Pribil | 403/62 X |
| 2,067,283 A | * | 1/1937 | Padgett | 464/134 |
| 2,443,066 A | * | 6/1948 | Breedlove | 411/259 |
| 3,249,685 A | * | 5/1966 | Heflin, Jr. | 285/236 |
| 3,334,928 A | * | 8/1967 | Schmunk | 285/236 |
| 3,643,580 A | * | 2/1972 | Siegel | 454/306 |
| 3,718,351 A | * | 2/1973 | Bakkerus | 285/236 |
| 3,874,713 A | * | 4/1975 | Myers | 285/340 |
| 4,340,244 A | * | 7/1982 | Scott | 285/8 |
| 4,643,465 A | * | 2/1987 | Green et al. | 285/236 |
| 4,669,586 A | | 6/1987 | Mettler | 188/322 |
| 4,840,513 A | * | 6/1989 | Hackett | 403/49 |
| 4,903,922 A | * | 2/1990 | Harris, III | 248/75 |
| 4,951,902 A | * | 8/1990 | Hardtke | 248/74.1 |
| 5,362,111 A | * | 11/1994 | Harbin | 285/92 |
| 5,641,152 A | * | 6/1997 | Angles et al. | 267/220 |
| 6,007,345 A | | 12/1999 | Francis et al. | |
| 6,102,606 A | * | 8/2000 | Muller et al. | 403/270 |
| 6,311,936 B1 | * | 11/2001 | Herr et al. | 248/75 |

FOREIGN PATENT DOCUMENTS

| | | |
|---|---|---|
| DE | 1 016 067 | 3/1958 |
| EP | 0 884 501 | 12/1998 |
| GB | 268571 | 4/1927 |
| GB | 882038 | 11/1961 |
| GB | 1167010 | 10/1969 |

* cited by examiner

*Primary Examiner*—Robert J. Sandy
(74) *Attorney, Agent, or Firm*—Cohen, Pontani, Lieberman & Pavane

(57) ABSTRACT

Tubular body, especially for the joint eye of a piston-cylinder unit, where the tubular body is formed from a flat sheet-metal blank having at least two stamped sleeve parts connected to each other by a connecting web. In the final fabrication state, the sleeve parts are axially aligned, one next to each other, with their end surfaces facing each other.

11 Claims, 5 Drawing Sheets

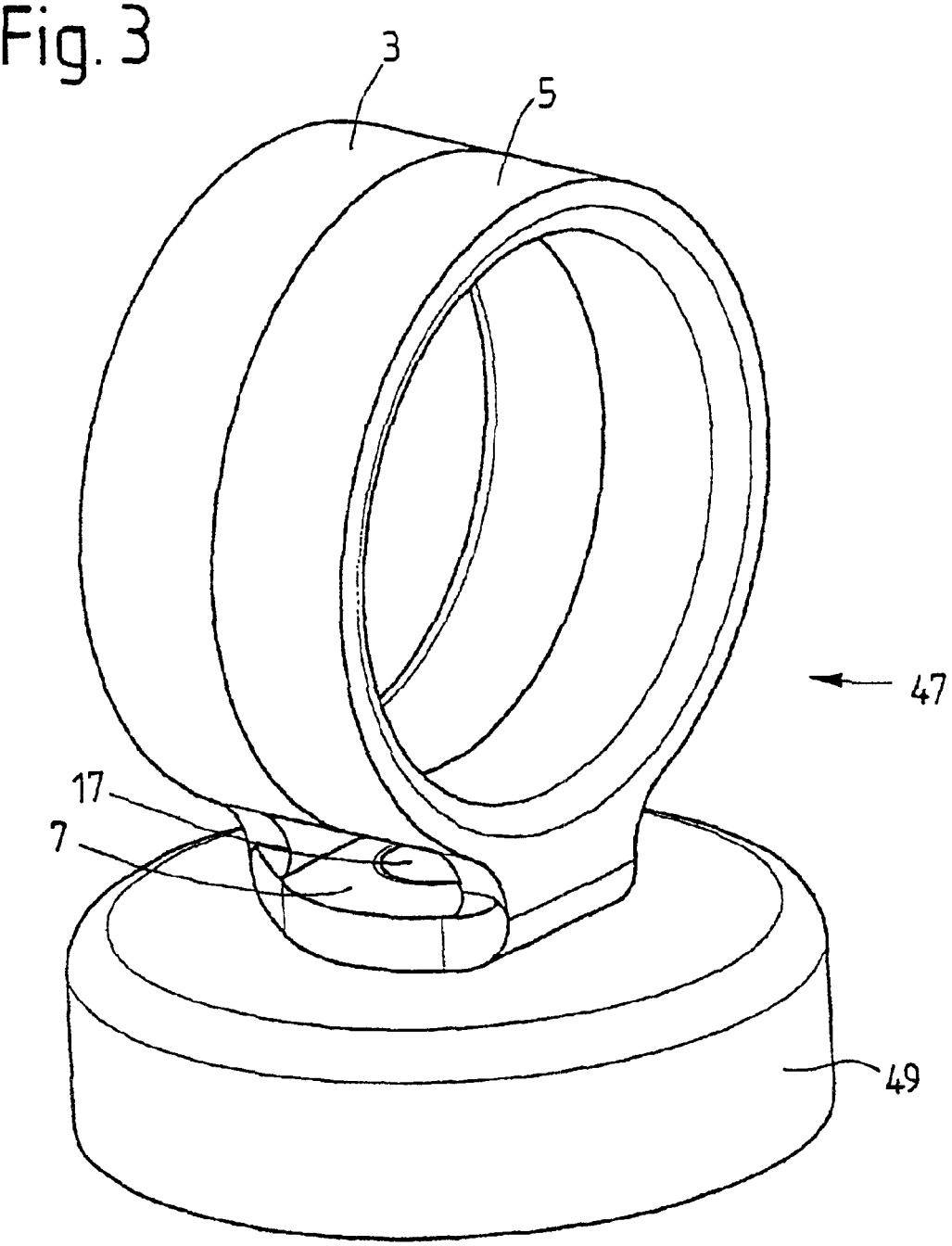

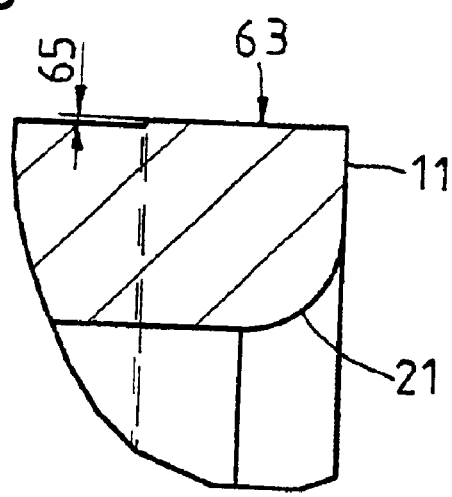
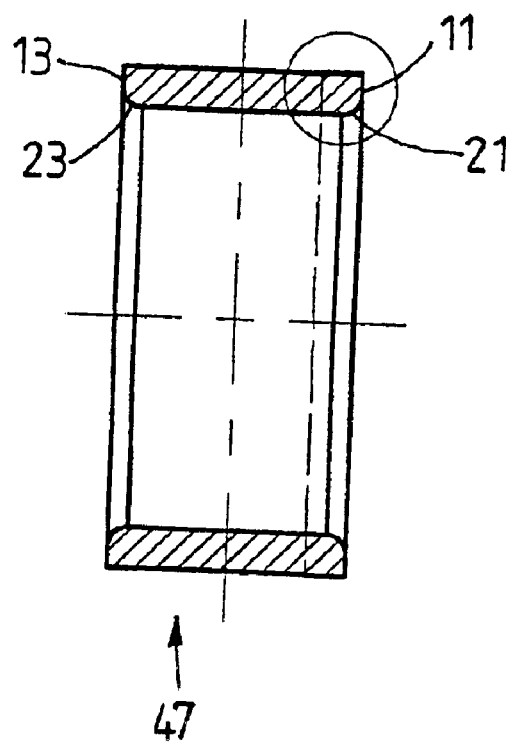

TUBULAR BODY, ESPECIALLY A JOINT EYE FOR PISTON-CYLINDER UNIT

BACKGROUND OF THE INVENTION

1. Field of the Invention

The invention pertains to a tubular body, especially for the joint eye holding a piston cylinder unit, which is formed from a sheet metal blank.

2. Description of the Related Art

An outer tubular body is required for the production of a joint eye. This tubular body can be produced from blanks of various types. Blanks which are cut to length from a tube are widely used. Because semi-finished tubular materials are comparatively expensive, alternative tubular bodies made from sheet-metal blanks have been in use for some time. A joint eye of this type is known from, for example, EP 0 884 501 A1. An area where a threaded rod can be connected is also provided on this joint eye. All joint eyes of this basic design, however, suffer from the problem that the amount of tensile force which can be transmitted depends on the load capacity of the weld which joins the rolled-up ends of the sheet-metal blank which has been formed into the tubular body. The load is transmitted to the joint eye in these cases by a load-transfer pin (not shown), which is parallel to the weld.

SUMMARY OF THE INVENTION

The object of the present invention is to realize a joint eye which combines the cost advantage of the rolled tubular body with the strength of the tubular body obtained by cutting a tube to length.

In accordance with the invention, the sheet-metal blank has at least two stamped circumferentially closed sleeve parts, which are connected to each other by a single connecting web. In the final fabrication state, the sleeve parts are coaxially arranged, one next to the other, with the end surfaces of the sleeve parts facing each other to form circumferentially closed joint eye.

The advantage of the invention is that there is no load-determining weld in the direction transverse to the tubular body. It is possible to use a very simple sheet-metal blank, which is much cheaper than a semi-finished product in the form of drawn tubing. In addition, only certain diameters and wall thicknesses of drawn tubing are commercially available. Such limitations no longer apply when the tubular body is made as a stamped and pressed part.

When it is desired to connect the adjacent sleeve parts to each other, it is possible to press a spring element and/or a damping element into the sleeve parts, which spring or damping element can also have axial stops to hold the sleeve parts together under tension.

So that the spring element and/or damping element can be installed easily and with reduced stress, it is advantageous to stamp transition surfaces into the ends of the sleeve parts opposite the facing end surfaces, these transition surfaces leading to the inside walls of the sleeve parts. The stamping process for producing the transition surface is virtually cost-neutral in comparison to the machining of a cut-to-length tubular body.

There is also the possibility of welding the sleeve parts together.

So that a connection can be established with an assembly such as the piston rod or cylinder of a piston-cylinder unit, it is provided that a pass-through opening for a fastening connector is stamped into the connecting web.

As a logical elaboration, at least the largest length section of the sleeve parts extends from the plane of the connecting web to the end surface. It is thus possible to provide a longer connecting web. The forming tools for the metal-forming process which determine the bending radii and the bending points can thus be inserted more easily, and larger bending radii can be allowed.

According to a preferred embodiment, the pass-through opening has an area of expanded diameter at the end next to the facing sleeve parts. The sleeve parts which are in contact with each other form the boundaries of the pass-through opening. As a result, the area of expanded diameter represents a kind of "clearing" for a connector body, such as the thread on the piston rod mentioned above.

So that the tubular body can be connected more easily to an assembly by means of, for example, a threaded element, flat surfaces (flats) for a wrench are stamped on opposite side edges of the connecting web in the area of the pass-through opening, These flat surfaces have transitions to the adjacent sides.

There is in principle the option of providing the connecting web with a transverse web, which can serve as a retainer in the final fabrication state of the tubular body. In the case of a tubular body for a joint eye of a piston-cylinder unit, one could imagine this retainer as, for example, a brake line holder.

In an alternative solution, the tubular body is stamped from a flat sheet-metal blank and has at each end a stamped-in transition surface to the inside wall of the tubular body. Thus a tubular body without a weld is again obtained, which has individually specified dimensions and is ready to be used with already stamped-in transition surfaces as it comes from the die set.

It is also advantageous for the tubular body to be provided on at least one end, in the area of the outside wall, with a sheared edge around the circumference, obtained by cutting off the border. Thus a clearly defined external contour is obtained, which meets elevated requirements on visual appearance.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3 shows a tubular body with a cap;

FIG. 4b shows a perspective view of the tubular body according to the sheet-metal blank of FIG. 4a;

FIG. 5a shows a tubular body as a stamped/pressed part with transition surfaces at its ends; and FIG. 5b shows a detail of FIG. 5a.

DETAILED DESCRIPTION OF THE PRESENTLY PREFERRED EMBODIMENTS

Figure 1A:
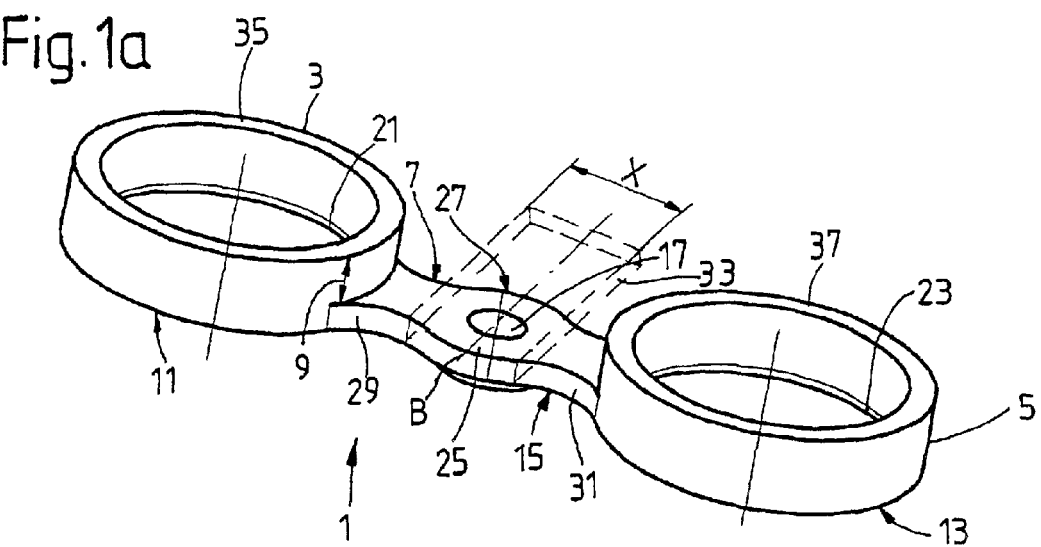
FIG. 1a shows a sheet-metal blank for a tubular body.

FIG. 1a shows a sheet-metal blank 1, which has sleeve parts 3; 5 at its ends, which parts are held together by a connecting web 7. In this exemplary embodiment, the sleeve parts are stamped out in a direction proceeding from the plane of the connecting web, so that a certain length section 9 stands completely free of the connecting web, whereas end surfaces 11; 13 are flush with the bottom surface 15 of the connecting web.

A circumferentially closed pass-through opening 17 having a circular profile is produced in the middle of the connecting web 7. This opening has an axis which is arranged radially with respect to the axis of the coaxial sleeve parts. The opening is intended to hold a connector (not shown), such as a piston rod 19 (see FIG. 2).

Transition surfaces 21; 23 are provided on the end surfaces 11; 13; these transition surfaces lead to the inside walls of the sleeve parts. In addition, the connecting web has flat surfaces 25; 27 for a wrench on opposite sides, these flat surfaces also having transition surfaces leading to the adjacent side areas 29; 31 to prevent the occurrence of a notch effect. Overall, the sheet-metal blank is designed with mirror-image symmetry with respect to a bending axis B.

For the bending process, a formed part 33, shown in broken line, with a width x is placed on top of the pass-through opening 17. Then the left half of the connecting web is bent approximately 90° to the right against the formed part 33, and the right half of the connecting web is bent approximately 90° to the left, so that the sleeve parts 3; 5 are now next to each other and their facing end surfaces 35; 37 are in contact.

Figure 1B:
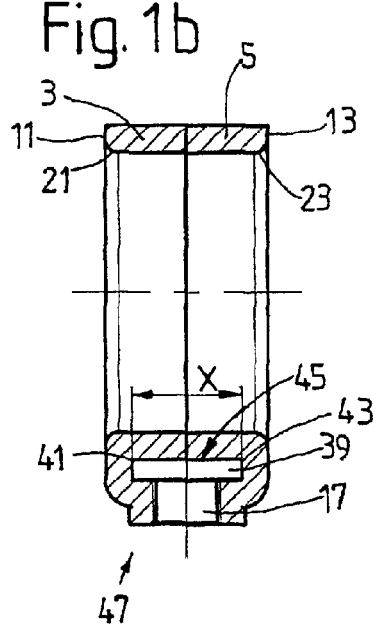
FIG. 1b shows a cross-sectional view of the tubular body.

FIG. 1b shows a cross section of this stage of the forming process. The formed part 33 (see FIG. 1a), which has been placed on top of the pass-through opening 17, has the effect of creating an area of expanded diameter 39, so that the unavoidable transition radii 41; 43 between the unformed connecting web 7 and the sleeve part 3; 5 are situated outside the pass-through opening 17. The two sleeve parts 3; 5 form a stop 45 for the connection of the piston rod mentioned above. FIG. 1b thus shows the tubular body 47 in its finished state.

Figure 1C:
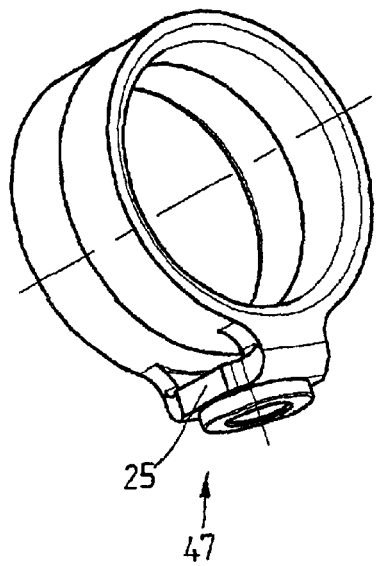
FIG. 1c shows a perspective view of the tubular body.

FIG. 1c shows the essential details of FIGS. 1a and 1b of the tubular body 47 in perspective. As can easily be seen, because the central area of the connecting web is not formed, the bottom surface of the connecting web 7 remains flat and can thus serve as a support surface for a washer or a cap 49 according to FIG. 3.

Figure 2:
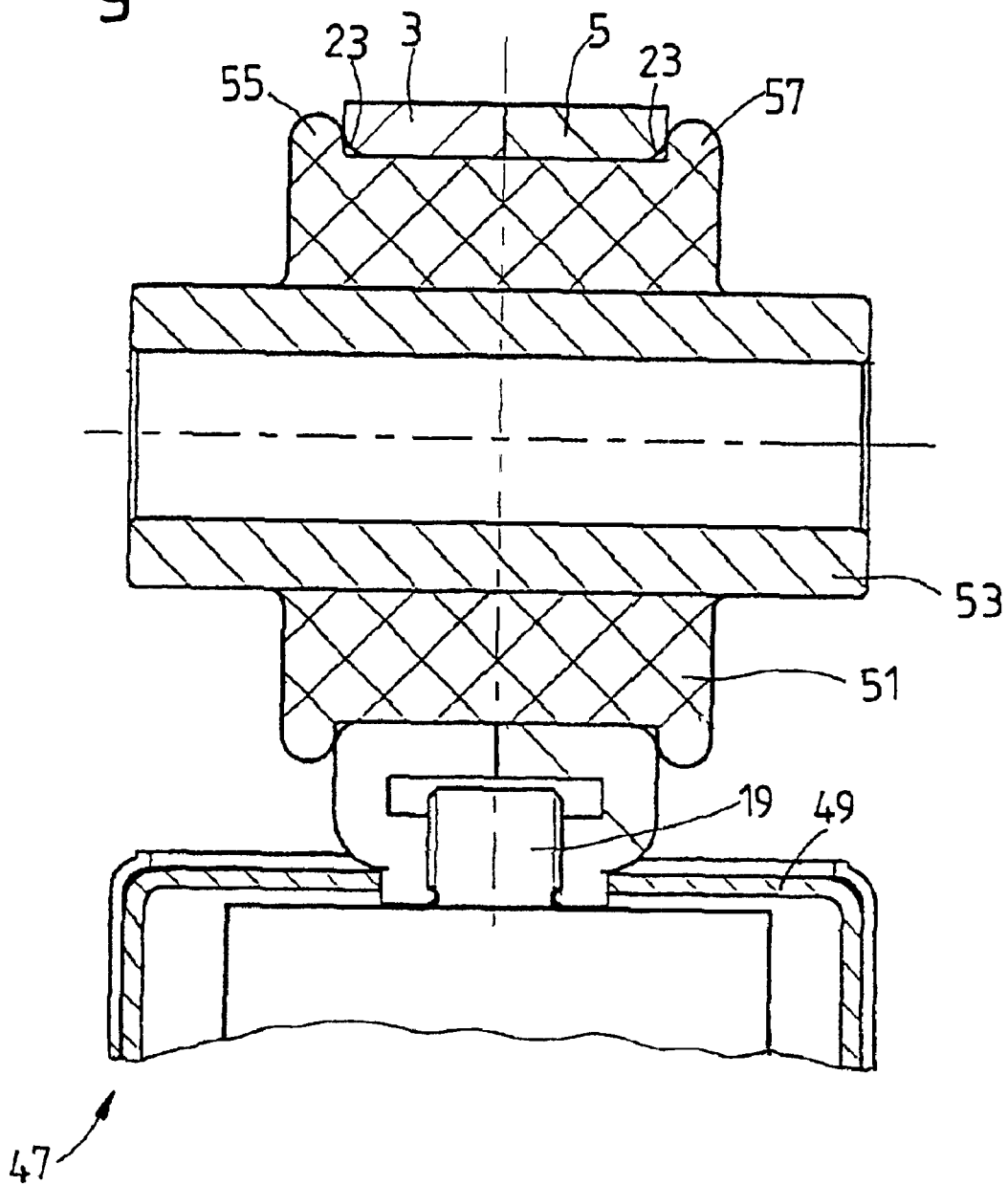
FIG. 2 shows a tubular body as a joint eye.

FIG. 2 shows the tubular body 47 in use as a joint eye, which has a spring element and/or a damping element 51, which has been pressed into the two combined sleeve parts 3; 5. The transition surfaces 21; 23 facilitate this assembly process. Inside the joint eye, a small fastening tube 53 is provided, which serves to hold a fastening element.

Outside the tubular body 47 in the radial direction, the spring element and/or the damping element 51 has axial stops 55; 57, which hold the two sleeve parts 3; 5 together under tension. Alternatively, the sleeve parts 3; 5 can also be welded together. In this diagram, it is easy to see that the two sleeve parts 3; 5 are seamless in the radial load direction and thus have no potential weak spots.

Figure 4B:
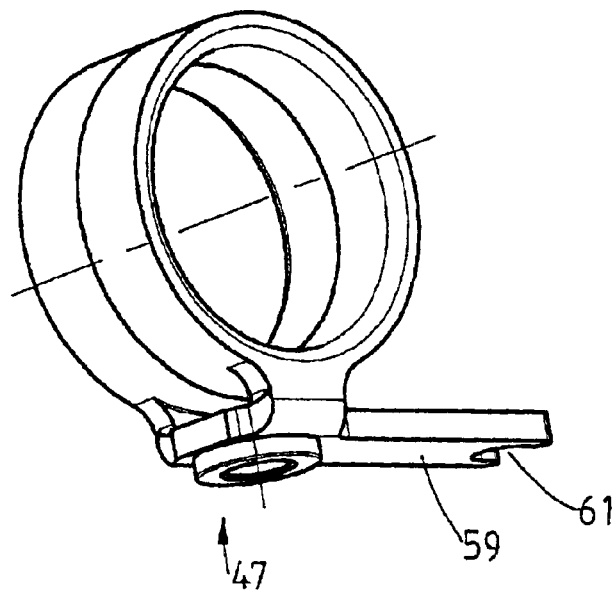
Figure 4A:
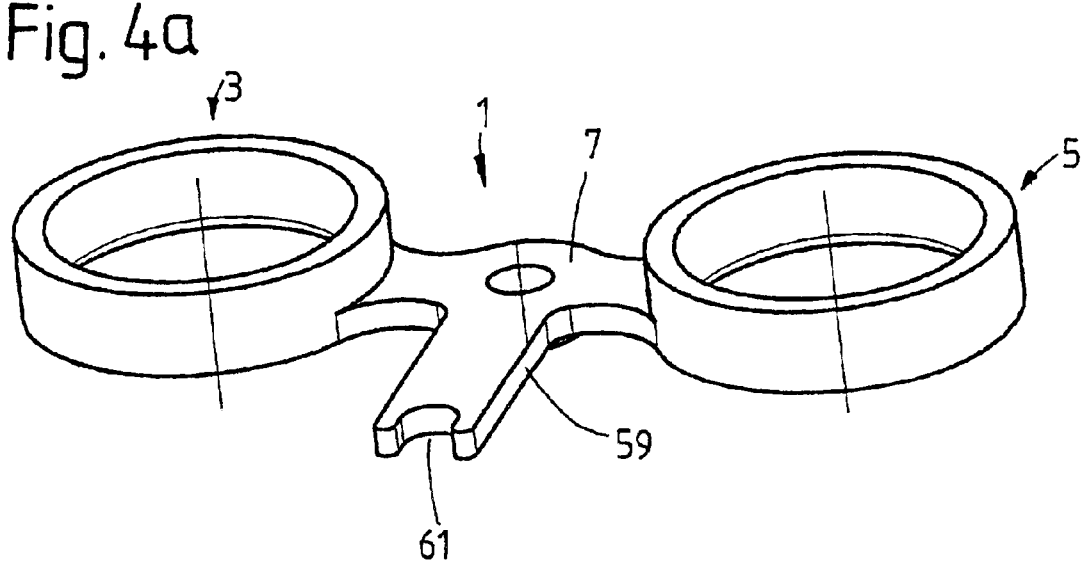
FIG. 4a shows a sheet-metal blank for a tubular body with a retainer.

FIGS. 4a and 4b, which have been explained in principle above, are provided to show that the connecting web 7 can be used for other purposes. For example, the connecting web has here a transverse web 59 with an opening 61 at the end, so that the transverse web can take over the job of a retainer on the finished tubular body. It could serve as a retainer for a brake hose, for example, which must often be guided through this area when the piston-cylinder unit is part of a vibration damper.

FIG. 5a shows a tubular body, which is produced from a flat sheet-metal blank in a stamping/pressing operation. In this stamping/pressing operation, the tubular body is formed with a circumferentially closed inside wall having transition surfaces 21; 23 at its ends 11; 13, so that it can more easily accept a spring element and/or a damping element 51 as shown in FIG. 2. The transition surfaces can be very easily made during the forming process and do not require any extra effort. A sheared edge surface 63 cuts off the border 65, which is an unavoidable result of the forming process. The radial dimension of this border is very small.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A joint eye formed from a sheet metal blank having a pair of stamped sleeve parts having axial end surfaces and connected by a web, said joint eye comprising
   a pair of stamped circumferentially closed sleeve parts connected by a one-piece connecting web, said sleeve parts being coaxial and having respective axial end surfaces which are mutually facing to form a one-piece joint eye, said sleeve parts further having respective opposed end surfaces facing oppositely from respective said mutually facing end surfaces, wherein each said sleeve part has an axial length extending from the mutually facing end surface to the opposed end surface, most of said length extending between said connecting web and the respective mutually facing end surface.

2. A joint eye as in claim 1 further comprising one of a spring element and a damping element pressed into said sleeve parts and holding said sleeve parts together under tension.

3. A joint eye as in claim 2 wherein said one of said spring element and said damping element comprises axial stops which hold said sleeve parts together under tension, said axial stops being located outside of said sleeve parts, oppositely from said mutually facing end surfaces.

4. A joint eye as in claim 1 wherein said sleeve parts have respective inside walls extending between said mutually facing end surfaces and said opposed end surfaces, each said sleeve part having a transition surface pressed into the opposed end surface and leading into the inside wall.

5. A joint eye as in claim 1 wherein said sleeve parts are welded together.

6. A joint eye as in claim 1 wherein said web comprises a stamped pass-through opening.

7. A joint eye as in claim 6 wherein said pass-through opening has an expanded diameter adjacent to said sleeve parts.

8. A joint eye as in claim 1 wherein said connecting web comprises a transverse web which can serve as a retainer during fabrication of the tubular body.

9. A joint eye as in claim 1 wherein said web comprises mutually opposed side edges having respective parallel flats for applying a wrench.

10. A joint eye as in claim 1 wherein said connecting web is connected to said sleeves flushly with said opposed end surfaces.

11. A joint eye as in claim 10 wherein said connecting web has a pass-through opening located centrally between said end surfaces.

* * * * *